United States Patent
Bonne

[11] Patent Number: 5,249,462
[45] Date of Patent: Oct. 5, 1993

[54] SAFE CHANNEL DESIGN FOR FLOW SENSOR CHIP MICROBRIDGES

[75] Inventor: Ulrich Bonne, Hopkins, Minn.

[73] Assignee: Honeywell Inc., Minneapolis, Minn.

[21] Appl. No.: 727,415

[22] Filed: Jul. 9, 1991

[51] Int. Cl.⁵ .............................................. G01F 1/68
[52] U.S. Cl. ............................. 73/204.21; 73/204.26
[58] Field of Search ............ 73/204.21, 204.22, 204.26, 73/204.23

[56] References Cited

U.S. PATENT DOCUMENTS

| | | | |
|---|---|---|---|
| 4,457,169 | 7/1984 | Lauterbach et al. | 73/204.21 X |
| 4,633,578 | 1/1987 | Aine et al. | 73/204.23 X |
| 4,785,662 | 11/1988 | Ohta et al. | 73/204.21 |
| 4,829,818 | 5/1989 | Bohrer | 73/204.22 |
| 5,014,552 | 5/1991 | Kamiunten et al. | 73/204.21 |

FOREIGN PATENT DOCUMENTS 0190624  10/1984  Japan .................. 73/204.21

Primary Examiner—Herbert Goldstein
Attorney, Agent, or Firm—Michael B. Atlass; Charles G. Mersereau

[57] ABSTRACT

The necked down transitional nozzle or channel leading to the measurement channel of a compact microanemometer gas meter having an open sensor is modified by introducing a flattened sector opposite the mounted sensor to eliminate particulate matter from being scattered in the direction of the sensor.

13 Claims, 1 Drawing Sheet

SAFE CHANNEL DESIGN FOR FLOW SENSOR CHIP MICROBRIDGES

CROSS REFERENCE TO RELATED APPLICATION

Cross reference is made to co-pending application Ser. No. 07/727,416 filed of even date and assigned to the same assignee as the present invention.

BACKGROUND OF THE INVENTION

Field of the Invention

The present invention relates to the flow measurement of gaseous fluids using electronic microsensors and, more particularly, addresses the problems associated with protecting directly exposed microsensors themselves without sacrificing microsensor sensitivity by providing a metering channel entry design that avoids damage due to debris and particulate matter carried by the flowing stream of interest. The system further avoids devices that clog easily and involves but a relatively low pressure drop for the achieved sensitivity to flow. The invention also reduces noise errors normally associated with fluid flow measuring devices occasioned by turbulent flow or with respect to proximate upstream and downstream interfering pipe fittings such as valves, elbows and the like in the distribution system.

Related Art

Hot film microanemometer packages for general use are known for both uni- and bi-directional flow applications. An example of such a device is illustrated and described in U.S. Pat. No. 4,501,144 to Higashi, et al, common of assignee with the present application. The microanemometers or "microbridges" themselves are quite inexpensive to produce. The small size and relatively fragile undercut suspended bridges of the sensors, however, make them vulnerable to damage from particulate matter and debris carried in the fluid stream. For that reason, packages containing devices of the class described have been constructed to be protective of the sensing elements. Thus, because applications vary, they have generally been designed for any possible adverse condition or placement, i.e., for the "worst case". This requirement has tended to make the packages very high cost items with complex sampling flow channel bypasses or diverted streams. Generally, sacrifices in sensitivity have had to be made to protect the sensors.

The prior packaged devices, like conventional orifice meters, for example, further have had severe use limitations with respect to placement in distribution networks of fluids to be metered. For example, most of the known packages are not designed to prevent or address the problem of flow transitions from laminar to turbulent flow within the required flow range. The flow needs to be reasonably laminar to minimize the noise amplitude of turbulence in order to take advantage of the high degree of sensitivity characterized by these devices. This leads to serious calibration and readout errors or severely limits use of the device. Also, these devices normally do not address the problems of minimizing pressure drop or permanent pressure loss in the conduit of the measured flow to thereby minimize aberrations in the fluid distribution network caused by metering.

An important consideration is the relatively fragile nature of the microbridge spans, themselves. In order to be very sensitive, the microbridge spans must be quite thin. This creates a rather fragile structure which, when left unprotected, is easily damaged by particulate matter and debris carried by the flowing gas stream. It has been found that particles (generally $\geq 200$ microns in size) and debris need to be either eliminated from the flowing gas or otherwise prevented from impacting the suspended bridges of the microbridge-type sensors. In this regard, particular problems have been noted with respect to particulate matter passing into and through the flow measurement channel length of reduced diameter and relatively higher velocity in which the vulnerable flow sensor device is mounted and positioned for more accurate sensing.

The transitional area along which the diameter is reduced or necked down from the general flow meter internal pipe size to that of the measurement channel not only constricts the flow area and increases flow velocity, but it also affects the paths of particulate matter carried along by the stream. Particles often strike the neck of the reducing segment and carom or ricochet off at random angles into the reduced diameter channel. This enhances the chance of a particle striking and damaging the rather fragile sensor. Particles travelling substantially parallel to the direction of flow, however, have little chance of damaging the sensor. Prior solutions to the problems of debris involved the use of a bypass or sampling channel or the insertion of very fine mesh screens to eliminate particulate matter. However, these solutions themselves caused a loss of sensitivity in the case of the bypass technique or, with respect to the fine mesh screens, clogging problems which, in turn, also produced a large increase in the permanent pressure drop.

Clearly, the need exists for a low-cost microanemometer-based fluid flowmeter characterized by a low pressure drop which, at the same time, prevents damage to the sensor in a manner that allows advantage to be taken of the extreme sensitivity associated with placement of the microbridge directly in the gas stream of 15 interest. This is especially true with respect to a compact meter for natural gas which can be retrofitted into existing distribution systems which often involves tight quarters between interfering pipe fittings such as proximate elbows, couplings, reducers and the like.

SUMMARY OF THE INVENTION

The present invention solves the problem associated with damage to the microbridge spans of a microanemometer flow sensor by random particulate impact by the provision of an unique entry geometry with respect to the transition between the meter flow channel and the narrower measurement flow channel in the mainstream of the fluid of interest. The invention creates a channel entry design which avoids an internal channel surface which tends to reflect suspended solid particles toward to the microbridge chip. While leaving the greater portion of the nozzle transition shape intact to perform its function of providing a uniform, laminar fluid flow pattern, a minor segment is modified to present an internal surface which avoids direct reflections which potentially would strike and damage the suspended spans of the microbridge chip. The modification of the invention is manifested by the provision of an unique channel transitional shape which includes a flat wall section or "flat spot" in the transitional throat opposite the position of the microbridge sensing chip. The size of the flat spot can vary between a completely flat wall section to a pie-shaped section, to a relatively narrow flat insert connecting to a section of the channel wall. The shape is used in conjunction with a laminarizing honeycomb or tube bundle just upstream of the transitional section. This unique nozzle design greatly reduces or eliminates those particle bounces which would direct the particle at the microbridge sensor surface.

One successful meter embodiment includes a plurality of features which combine to produce an unique and advantageous metering performance at low manufacturing cost. The system features convenient inlet and outlet pipe fittings for each retrofit or original installation. The inlet of the device includes directional vanes and a plurality of settling traps in conjunction with a coarse screen of approximately ten to twenty mesh is located between settling traps. A laminarizing honeycomb is positioned just upstream of an exposed microbridge flow sensor. The honeycomb is generally about 0.5-2.0 inches in length and has a cell size of about 0.125 inches (3.5 mm) and a wall thickness of 0.001-0.002 inches (20-50 microns). The honeycomb functions to reduce turbulence and further reduce the effect of proximate upstream pipe fittings.

The flow sensing microbridge is located in a measuring channel or throat section of reduced cross-section to achieve the desired flow speed and uniformity of velocity profile in the vicinity of the sensing microbridge. With respect to the flow channel, the surface of the flow measuring microbridge may be mounted to be flush with the wall, but preferably protrudes into the flow channel as much as about 1 mm in order to emerge from the boundary layer.

More particularly, with regard to the transition from the upstream portion of the meter into the reduced diameter measuring flow channel, the present invention employs an unique transition configuration with respect to the transition in which the flow channel diameter is necked down or reduced asymmetrically with respect to the reduced diameter nozzle-shaped constriction which functions to increase the flow velocity at the sensor while reducing the overall pressure drop of the system. With respect to the center line, a portion or all of the reduction shoulder located upstream of and opposite the microbridge sensor is made generally flat. In this manner, the curved, nozzle-shaped surface off of which dust or other particles could bounce toward the opposite wall in a direction in which they would impact the microbridge sensor is eliminated.

The shape modification may be accomplished by replacing a portion of the symmetric necked down internal wall of the flow channel just upstream of the nozzle with a flat wall on the side opposite the microbridge sensor. It may be in the form of a pie-shaped segment or a relatively small flat insert segment disposed in the channel at a point opposite the point on the wall where the microbridge sensor is positioned. It has been found that such a configuration greatly reduces damage to the microbridge chip sensor caused by particles (generally greater than 300 micrometers) bounding from one side of the inner wall to the other at angles random to the sensor while simultaneously providing space for particulate traps at the bottom of the channel.

BRIEF DESCRIPTION OF THE DRAWINGS

In the drawings, in which like numerals are utilized to designate like parts throughout the same.

DETAILED DESCRIPTION

The present invention overcomes disadvantages associated with previous hot film microanemometer metering devices for gaseous fluid flow sensing. The invention provides a compact, simple, low cost microanemometer gas flow meter package that allows full exposure of the microbridge sensor yet minimizes the chance of random particle collisions with the sensor. Turbulence noise reduction, clogging avoidance and reduced pressure drop in relation to the achieved sensitivity to flow are also achieved. Its compactness further distinguishes it from prior bulky, mechanical bellows or diaphragm-based measurement devices. The system reduces effects by proximate obstacles or pipe fittings such as elbows upstream or downstream of the flow meter in the gas distribution network. The electronics design provide for a repeatable, low noise operation. The design of the support structure allows for low cost manufacturing and integration with, for example, a shut-off valve and pressure regulator, if desired. The system is particularly suited for the precise measurement of gas flows including the metering of fuel gases, natural, city, propane, butane, or the like.

The meter system includes a combination of a plurality of sequentially encountered particulate traps systems, coarse screen and a laminarizing or flow straightening structure upstream of the sensors to reduce the turbulent effects and allow the use of an unprotected dynamic or flow measuring microbridge sensor. The dynamic microbridge sensor is used in combination with a novel modified upstream channel geometry which reduces the probability of random particulate matter from being reflected in the direction of the sensor.

Figure 1:
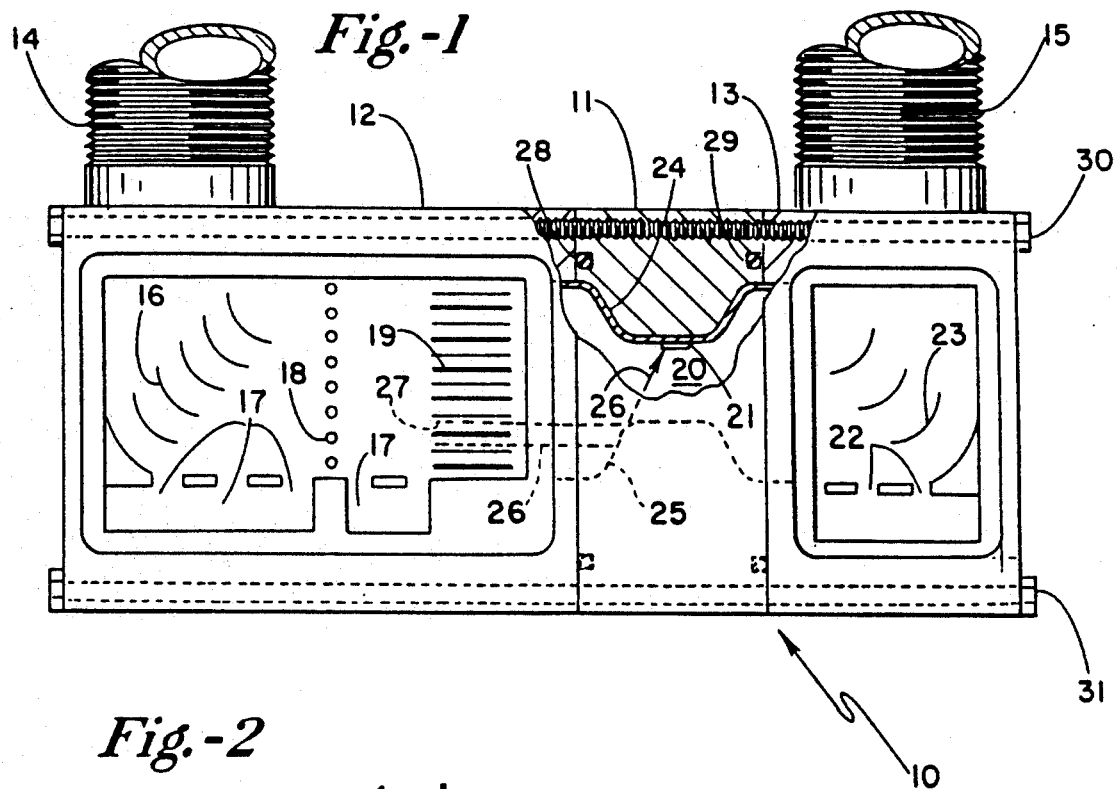
FIG. 1 is a schematic elevational view of the compact flow measurement system of the invention.
Figure 2:
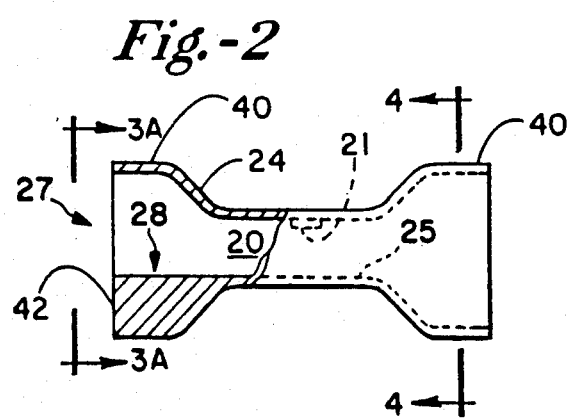
FIG. 2 is a further view of the flow channel and flow channel transition of FIG. 1.
Figure 4:
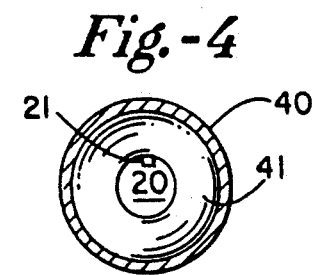
FIG. 4 is a view generally along lines 4—4 of FIG. 2.
Figure 3A:
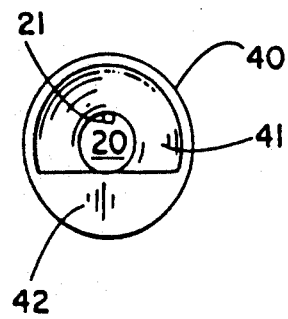
FIGS. 3a-3c are illustrative cross-sectional views taken along lines 3a, b and c in FIG. 2 showing alternate transitional configurations for the wall across from the microbridge sensor.
Figure 3B:
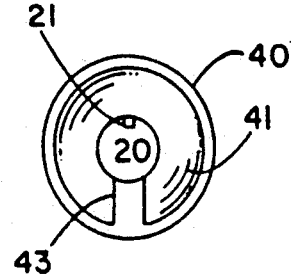
Figure 3C:
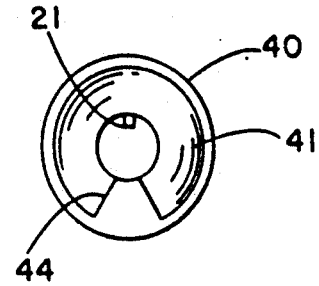

FIG. 1 depicts a simple schematic view of a compact flow meter configured in accordance with the principles of the invention. The system is shown generally at 10 and includes a main body having a measuring flow channel segment 11 sandwiched between segments 12 and 13. The system includes threaded inlet and outlet members 14 and 15 which can connect the system into any piping configuration as desired. The inlet section of the meter body portion 12 may include a series of generally parallel spaced directional flow baffles 16, a series of sequentially encountered particulate traps 17 located in the lower side of the meter body portion 12. A coarse screen member 18, typically of 10 to 20 mesh per inch, is positioned upstream of and protects a honeycomb 19 which further laminarizes the flow and directs it into a reduced diameter channel or flow channel nozzle 20 which contains the dynamic flow sensor 21. A further series of traps as at 22 may be provided together with a series of directional flow baffles 23 at the outlet of the metering system.

In accordance with the transition throat, the upper and lower segments of which are labeled 24 and 25, respectively, in FIG. 1, particulate matter not trapped by the particle traps 17 and which navigates the coarse screen 18 and honeycomb system 19 may be potentially strike and damage the microbridge sensor 21. This normally happens when particulate matter strikes the surface 25 and is reflected up and carried into the microbridge as shown at 26. This problem exists particularly in the segmental area directly opposite the microsensor. Particulate matter deflected from the adjacent surface 24 or from other portions about the periphery of the throat has been found to present very little danger to the sensor 21 as it is very unlikely that it would be reflected in a direction with an angle dangerous to the microsensor 21.

By means of the present invention, the lower transitional throat area of line 25 is modified to preclude the deflection of particulate matter toward the microsensor 21 by generally moving the transition of a predetermined portion of the lower transitional area back beyond the honeycomb 19 as depicted by the phantom line 27. It has been found that a relatively flat entry area just upstream and through the reducing throat into the measuring channel disposed in a location substantially opposite the location of the sensing microbridge substantially precludes deflection of particulate matter against the microbridge sensor with respect to the stream flowing through the reduced measuring channel 20. A series of possible embodiments utilizing the modified transitional throat configuration of the invention are illustrated in FIGS. 2, 3a-c and 4. In these figures, the large diameter conduit or full-width conduit is denoted by 40 and the reduced diameter conduit or measuring conduit by 31. As can be seen from the figures, the transitional modifications 42, 43 and 44 can be accomplished using a plurality of shapes encompassing different sized sectors of the throat from the full section beneath the measuring channel at 42 to a very narrow segment at 43 of FIG. 3b. It should be noted that the center of the modified throat transition 42-44 is disposed opposite the location of the microbridge sensor 21.

Of course, in accordance with the present invention, the laminarizing or flow directing honeycomb 19 can be modified in accordance with the location and shape of the modified transition sections 42-44.

It will further be noted with respect to the assembly of the compactor gas meter of the invention that the section 11 containing the microsensor mounted in the reduced diameter measurement channel may further be sealed between inlet and outlet sections 12 and 13 by a pair of O-rings 28 and 29. The three sections 11, 12 and 13 are bolted together by four through bolts shown partially at 30 and 31 in a well-known manner to provide a sturdy, gas-tight device.

The sensor package 21 is also sealed in gas-tight relation to the meter body by conventional means, not shown. Normally, the outer surface of the flow sensor 21 is about flush with the inner pipe wall so that the microbridge itself sticks out into the flow channel by as much as about the chip's thickness.

With respect to the thin film microbridge or anemometer sensors such as those depicted by reference numeral 21, very small and very accurate microbridge semiconductor chip sensors of the class described in which etched semiconductor microbridges are used as composition or flow sensors are well known and available. Such sensors might include, for example, a pair of thin film sensors flanking a thin film heater. Semiconductor chip sensors of the class described are treated in a more detailed manner in one or more patents including U.S. Pat. Nos. 4,478,076, 4,478,077, 4,501,144, 4,555,939, 4,651,564 and 4,683,159, all common of assignee with the present invention. To the extent necessary, additional details with respect to the microbridge sensors themselves may be incorporated by reference from these cited documents.

For the purposes of the present application, it should suffice to say that if the dynamic flow sensor 21, for example, comprises a pair of thin film sensors symmetrically flanking a thin film heater. The sensor can be used to sense flow in either direction, and this further allows the flowmeter system of the present invention to be constructed as reversible with respect to the conduit system should such a configuration be desired. In any event, the system is reversible with respect to the mode of measurement of the microbridge system itself. Connection to the heater and sensors is also conventional and available from the incorporated references.

Thus, for sensing dynamic flow, the sensor 21 is directly exposed to the stream of fluid flowing past it in the conduit. By designing in adequate upstream particulate matter deflection protection and turbulent flow protection, the full sensitivity of the microbridge system may be directly utilized. The use of deflection protection channel transition modification in addition to the particulate trapping system, the screen and honeycomb allow the pen sensor to be used and very accurate flow measurements made available to the metering or instrument system with little danger for damage to the sensitive microbridge unit itself.

Of course, however, the accuracy of measurement of dynamic flow of the fluid in the system is also enhanced by the provision of a substantially laminar flow profile, i.e., one in which the Reynolds number, $n_{Re}$, is $\leq 2000$ based on the passage diameter, past the microanemometer device. The system of the present invention substantially eliminates turbulent flow, and the deflection prevention system substantially eliminates the probability of damage to the microanemometer due to the presence of particles in the flowing fluid.

The overall pressure drop of the system of FIG. 1 has been measured and found to be less than that of an earlier experimental embodiment which did not use traps and honeycombs but which instead used a total of 5 30-40 mesh screens to achieve a reduction in transmitted particulate matter.

Of course, the schematic diagram of FIG. 1 is intended to show the internal portion of a meter housing such as a gas meter housing which would include in an overall structure, an associated shut-off valve and regulator. However, the principles and operation of the system can be adequately explained on the basis of the drawing FIG. 1. The gas thus enters the system through 14, flows between the deflectors 16, across and around the traps 17 and past the coarse screen 18, through honeycomb 19 and into the nozzle-shaped section of the flow channel 20. The gas flows through the channel 20 and out the upper right connection 15 after passing traps 22 and baffles on deflector 23.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications both as to equipment and procedure details can be accomplished without departing form the scope of the invention itself.

What is claimed is:

1. A compact microanenmometer-based flow meter for a gaseous fluid of interest comprising:

inlet and outlet means for connecting the flow meter into a distribution system for the gaseous fluid of interest;

generally hollow meter body means connected between the inlet and outlet accesses and describing an internal flow path;

a substantially full flowing measuring channel characterized by a segment of constricted diameter connected between the inlet and outlet means and being within the meter body through which the fluid flows wherein the constricted diameter segment has an inlet side and an outlet side, the inlet side joined by a gradual segment entry transition to the inlet means and said outlet side joined to said outlet means directly or indirectly;

a microanemometer flow sensor associated with the flow meter and disposed in the constricted diameter segment on one wall thereon, so as to be directly exposed to the main fluid flow stream through said constricted segment;

wherein the constricted diameter segment entry transition is further characterized by an inner wall deflection control means provided on the inlet side on the wall substantially opposite the microanemometer to discourage the reflection of particles which may be carried by the gaseous fluid of interest toward the microanemometer;

a particulate trapping system including a plurality of sequentially encountered particulate trap means disposed in the fluid path between the inlet means to said flow meter and the microanemometer means; and at least a first laminarizing means also disposed in the stream between the inlet means and the micronemometer sensor.

2. The compact microanemometer-based flow meter of claim 1 wherein the deflection control means comprises an asymmetric opening at the inner wall.

3. The compact microanemometer-based flow meter of claim 2 wherein the measurement channel entry transition is further characterized by a flat internal wall section opposite the microanemometer sensor.

4. The compact microanemometer-based flow meter of claim 2 wherein the asymmetric opening is a flat wall section facing said inlet side, with a relatively flat entry area in the constricted segment opposite said microanemometer.

5. The compact microanemometer-based flow meter of claim 2 wherein the asymmetric opening is a pie-shaped wedge facing said inlet side.

6. The compact microanemometer-based flow meter of claim 2 wherein the asymmetric opening is a narrow insert facing said inlet side.

7. The flow meter of claim 1 further comprising a coarse screen means disposed between the particulate trap systems and the laminarizing or flow straightening structure.

8. The flow meter of claim 1 wherein the laminarizing means is an elongated honeycomb structure.

9. The flow meter of claim 2 wherein the laminarizing means is an elongated homeycomb structure.

10. The flow meter of claim 3 wherein the laminarizing means is an elongated honeycomb structure.

11. In a microanemometer gaseous fluid flow measuring system including a microanemometer flow sensor having suspended heater and sensor means disposed in and exposed to the mainstream of the fluid, the flow of which is to be measured, said flow sensor located on a wall of a measuring channel segment of reduced diameter connected by gradual channel entry and exit transition segments, the improvement comprising deflection control means wherein the measurement channel entry transition segment is further characterized by an inner wall deflection control means opposite the microanemometer to discourage the deflection of particles carried by the gaseous fluid toward the microanemometer.

12. The compact microanemometer-based flow meter of claim 11 wherein the deflection control means comprises an asymmetric opening at the inner wall of the entry transition segment.

13. The compact microanemometer-based flow meter of claim 12 wherein the measurement channel entry transition segment is further characterized by a flat internal wall section opposite the microanemometer sensor.

* * * * *